Patented Aug. 15, 1933

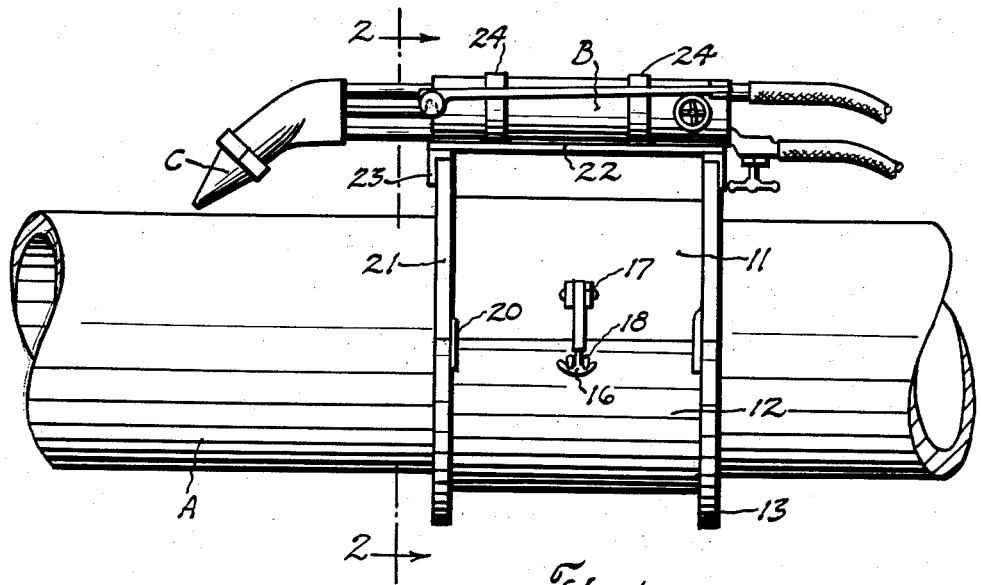
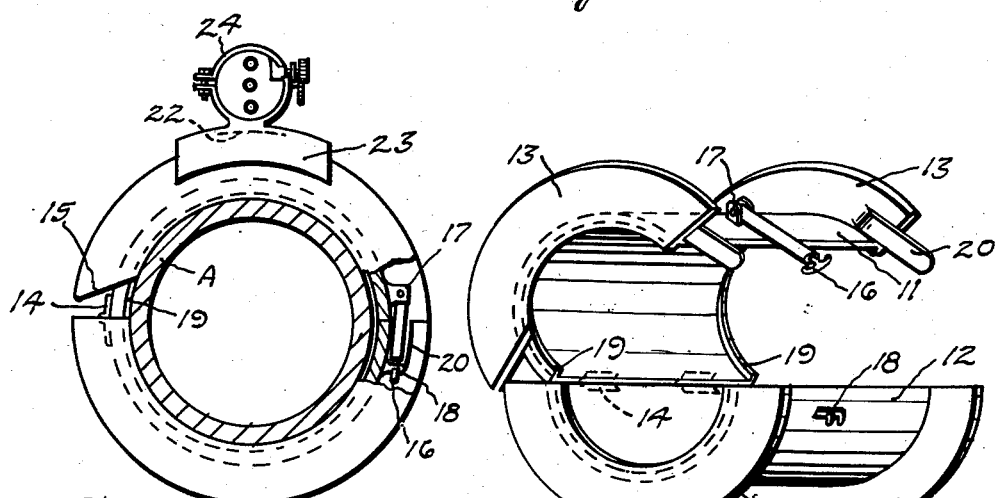
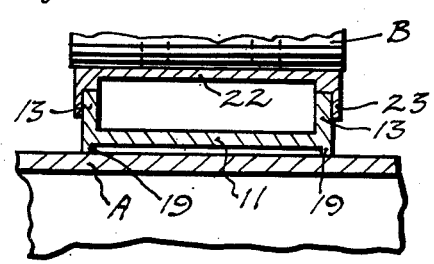

1,922,529

UNITED STATES PATENT OFFICE 1,922,529

GUIDE FOR CUTTING TORCHES

Andrew F. Day, Dallas, Tex., assignor to A. F. Day Construction Company, Dallas, Tex., a Corporation of Texas Application July 18, 1932. Serial No. 623,183

12 Claims. (Cl. 266—23)

This invention relates to new and useful improvements in guides for cutting torches.

One object of the invention is to provide an improved sectional guide which may be quickly clamped on a body which is to be cut wtih a torch, whereby the torch may be guided around said body and a true cut at exactly right angles to the longitudinal axis of the body may be made.

A particular object of the invention is to provide a sectional guide member arranged to be quickly clamped around the work and having tracks for supporting a torch carrier so that the latter may be easily and readily moved around the guide to produce a true and substantially smooth cut.

Another object of the invention is to provide a guide device so arranged as to be clamped on a pipe or other member having an uneven surface and in such a manner that the guide will not be tilted or thrown out of adjustment.

A very important object of the invention is to provide a simple guide which may be applied to a pipe or other member in the field, thus making it unnecessary to take the pipe or member into a shop, or to provide complicated or expensive mechanism for doing the work.

A further object of the invention is to provide a guide in which the carriage merely rests upon annular guide members and is not positively attached thereto, so that should the work slip, fall or become displaced, the carriage and torch will remain in the hand of the operator, thereby being saved from injury and also permitting the operator to quickly step away from the work while still holding the torch.

A construction designed to carry out the invention will be hereinafter described together with other features of the invention.

The invention will be more readily understood from a reading of the following specification and by reference to the accompanying drawing in which an example of the invention is shown, and wherein:

Figure 1 is an elevation showing a guide constructed in accordance with the invention, supporting a cutting torch in position to cut a pipe, Figure 2 is a transverse vertical sectional view taken on the line 2—2 of Figure 1, Figure 3 is an isometrical view of the guide partially opened, and Figure 4 is a sectional view showing the carriage and the guide.

In the drawing the numeral 11 designates a semicylindrical section or member and 12 a complementary cylindrical section or member, which cooperates to provide a separable circular guide member or support. Each guide section includes a semicircular guide flanges 13. When the sections are fastened together a cylindrical sleeve and circular or annular flanges are formed by the parts which have been described.

The sections are connected by hinges 14 fastened to the jackets and in order that the sections may be swung apart, as is shown in Figure 3, the flanges 13 of the section 11 are undercut at 15 so that they will swing over the ends of the flanges of the section 10 when the guide is opened. Any suitable means for fastening the sections together may be employed, and as an illustration I have shown a spring hook 16 hinged to ears 17 on the section 11 and engaging keepers 18 on the section 10. Hooks of this type are in common use for fastening the hoods of automobile engines and in numerous other places.

The jackets 12 are provided with semicircular internal ribs 19, as is shown in Figures 3 and 4, for engaging on the surface of the pipe A. These ribs support the inner surface out of engagement with the surface of the pipe and provide narrow contacts which can easily be seated on the roughened or uneven surface of a pipe. By this arrangement the guide may be more truly clamped around the pipe and by rotating the sections before fastening them the ribs would readily cut through ordinary surface accumulations so as to find seats on the smooth surface of the pipe. This is an important feature because the guide must be true.

In order to properly match and register the flanges 13 of each section, those of the section 11 are provided on their inner sides with lugs which overlap the inner sides of the adjacent flanges of the section 12. It is desirable that the outer edges or peripheries of the flanges 13 form true circular tracks 21 concentric to the surface of the pipe A; however, this is not essential and some variation would be permissible.

A carriage 22 is provided with arcuate shoes 23, which are angular in cross-section so as to ride on the tracks 21 and overhang the outer sides or faces of the flanges 13. It is quite important that the outer faces of the flanges be finished true to the transverse axis of the pipe, so as to provide guides at right angles to the longitudinal axis of the pipe. The carriage is provided with split clamps 24 in which the barrel of a gas torch B is secured. The torch is of the usual type now in common use and the nozzle C of such torches is adjustable. This nozzle may be adjusted to direct its flame onto the pipe A at the desired angle. The clamps permit the barrel to be rotatably adjusted, whereby the nozzle C may be brought to the desired position. The carriage is clamped to the nozzle and may be lifted from the guide and placed thereon conveniently.

In using the device, the sections 10 and 11 are fastened around the pipe at the proper distance from the line which is to be cut. This is easily and quickly done. It is obvious that it is only necessary to provide clearance around the pipe and it is not necessary to have any special equipment for holding the pipe in place.

The carriage 22 is placed on the tracks 21 and adjustments made so that the nozzle C will direct the flame onto the line which is to be cut. The operator then moves the carriage circumferentially of the guide on the tracks 21 and a circular cut is thus made in the pipe A. The outer faces of the flanges 13 being finished smooth and true and the shoes having a snug sliding fit thereon, it is obvious that the nozzle will be held against movement transversely of the cut, thereby assuring a smooth edge which will be free from variations.

By adjusting the nozzle C at different inclinations the edges of the cut may be inclined or beveled as desired. The work may be quickly done in the field and it is only necessary to provide the guide and the carriage in order to efficiently carry out the operation.

It is pointed out that the guide member is firmly fastened around the pipe and the flanges 13 are thus disposed radially of the longitudinal axis of said pipe and become stationary positive guides. By spacing the flanges apart, an elongated carriage may be used and this carriage maintained substantially in parallelism with the longitudinal axis of the pipe while it is being moved circumferentially thereof on said flanges. This will assure an even cut. The shoes 23, merely resting upon the tracks 21, are not positively connected to said flanges and the carriage may be lifted and thus quickly detached from the flanges. This has several advantages. It permits the guide member to be rather roughly handled in placing it upon and removing it from the pipe, because the carriage is attached to the torch and the torch is thus saved from injury and is out of the way when the guide member is being placed or removed. Further, should the pipe slip, fall, or become displaced, the guide will be detached from the carriage while the latter is held in the hand of the operator and the operator may quickly step aside without releasing his hold on the torch, at the same time pulling the torch and carriage from the guide. By greasing the tracks 21, it is obvious that wear is reduced to a minimum. The structure is extremely simple, being free from guide slots and retaining nuts and bolts.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. In a torch cutting guide, the combination of a sectional guide member arranged for fastening around the work to be cut, means on the inner circumference of the sections of the member for engaging the work and supporting the said sections elsewhere out of contact with the work, and a hand carriage having means for mounting a torch thereon and arranged to be moved by hand circumferentially of the guide and the work.

2. A torch cutting guide including, a guide member arranged for mounting on the work to be cut, and a hand carriage having means for mounting a torch thereon and provided with a support for engagement on the guide, said carriage being manually movable circumferentially of the guide and the work and unattached to said guide so as to be lifted therefrom.

3. A torch cutting guide including, a guide member having spaced radial guides and provided with means for fastening it on the work to be cut, and a hand torch carriage separate from said guide member and freely movable therefrom having supports for engaging the guides of said member, whereby said carriage may be moved manually circumferentially of the guide and the work.

4. A torch cutting guide including, a guide member having a pair of spaced substantially annular guides and arranged for fastening on the work to be cut, and an elongated hand carriage extending longitudinally of said member and having means for mounting a torch thereon, said carriage being freely movable on the guides of said member circumferentially of the work.

5. A torch cutting guide including, a guide member having a pair of spaced substantially annular guides and arranged for fastening on the work to be cut, and an elongated hand carriage extending longitudinally of said member and having means for mounting a torch thereon, said carriage being freely movable on the guides of said member circumferentially of the work, said carriage also being removable radially from the guides while held in the hand of the operator.

6. A torch cutting guide including, a guide member having a pair of spaced substantially annular guides and arranged for fastening on the work to be cut, and an elongated hand carriage having means for mounting a torch thereon and extending longitudinally of said member provided with spaced supports movable circumferentially on said guides for maintaining said carriage in substantially axial alinement with the work when moved circumferentially thereof.

7. A torch cutting guide including, a cylindrical sectional guide member arranged for fastening around the work to be cut, and a hand carriage having means for mounting a torch thereon and provided with a support for engagement on the guide, said carriage being manually movable circumferentially of the guide and the work and unattached to said guide so as to be lifted therefrom.

8. A torch cutting guide including, a guide member having substantially annular guide means for mounting around the work to be cut, and a manually movable torch carriage unattached to the guide means for engaging thereon and movable circumferentially of the work.

9. A torch cutting guide including, a guide member comprising semi-cylindrical sections having radial flanges at their ends provided with tracks, means for fastening the member around the work to be cut, and a hand carriage having means for mounting a torch thereon provided with spaced shoes for engaging on the tracks of the flanges of said member.

10. A torch cutting guide including, a guide member comprising semi-cylindrical sections having radial flanges at their ends provided with tracks, means for fastening the member around the work to be cut, and a hand carriage having means for mounting a torch thereon provided with spaced shoes for engaging on the tracks of the flanges of said members, the shoes having portions overhanging the outer sides of the flanges for preventing longitudinal displacement of the carriage.

11. A torch cutting guide including, a guide member comprising semi-cylindrical sections having radial flanges at their ends provided with tracks, means for fastening the member around the work to be cut, a hand carriage having means for mounting a torch thereon provided with spaced shoes for engaging on the tracks of the flanges of said member, and reduced supports in the bore of the guide member for engaging the work.

12. A carriage for a torch cutting guide including, an elongated member, split clamps on the upper side of the member spaced apart for securing a torch longitudinally of said member, and arcuate guide shoes depending from the member in spaced order and extending transversely thereof.

ANDREW F. DAY.